United States Patent
Lee et al.

(10) Patent No.: US 7,734,555 B2
(45) Date of Patent: Jun. 8, 2010

(54) SEPARATE LEARNING SYSTEM AND METHOD USING TWO-LAYERED NEURAL NETWORK HAVING TARGET VALUES FOR HIDDEN NODES

(75) Inventors: Ju Hong Lee, Incheon (KR); Bum Ghi Choi, Seoul (KR); Tae Su Park, Incheon (KR)

(73) Assignee: INHA-Industry Partnership Institute, Incheon (KR)

( * ) Notice: Subject to any disclaimer, the term of this patent is extended or adjusted under 35 U.S.C. 154(b) by 725 days.

(21) Appl. No.: 11/457,601

(22) Filed: Jul. 14, 2006

(65) Prior Publication Data
US 2007/0282772 A1    Dec. 6, 2007

(30) Foreign Application Priority Data
May 19, 2006   (KR)   ...................... 10-2006-0045193

(51) Int. Cl.
G06N 3/08    (2006.01)
(52) U.S. Cl. ........................................................ 706/25
(58) Field of Classification Search .................... 706/25
See application file for complete search history.

(56) References Cited

OTHER PUBLICATIONS

Bumghi et al ("Alternate Learning Algorithm on Multilayer Perceptrons" 2006).*

Bumghi Choi's "Seperately Trained Two-Layered Networks with the Target Values of Hidden Units".*

Choi, Bumghi "Separately Trained Two-Layered Networks With the Target Values of Hidden Units" The Florida State University College of Arts and Sciences. 1995.

* cited by examiner

*Primary Examiner* — David R Vincent
*Assistant Examiner* — Lut Wong
(74) *Attorney, Agent, or Firm* — Brown & Michaels, PC

(57) ABSTRACT

Disclosed herein is a separate learning system and method using a two-layered neural network having target values for hidden nodes. The separate learning system of the present invention includes an input layer for receiving training data from a user, and including at least one input node. A hidden layer includes at least one hidden node. A first connection weight unit connects the input layer to the hidden layer, and changes a weight between the input node and the hidden node. An output layer outputs training data that has been completely learned. The second connection weight unit connects the hidden layer to the output layer, changing a weight between the output and the hidden node, and calculates a target value for the hidden node, based on a current error for the output node. A control unit stops learning, fixes the second connection weight unit, turns a learning direction to the first connection weight unit, and causes learning to be repeatedly performed between the input node and the hidden node if a learning speed decreases or a cost function increases due to local minima or plateaus when the first connection weight unit is fixed and learning is performed using only the second connection weight unit, thus allowing learning to be repeatedly performed until learning converges to the target value for the hidden node.

6 Claims, 16 Drawing Sheets

SEPARATE LEARNING SYSTEM AND METHOD USING TWO-LAYERED NEURAL NETWORK HAVING TARGET VALUES FOR HIDDEN NODES

REFERENCE TO RELATED APPLICATIONS

This application claims an invention which was disclosed in Korean (Republic of) application number 10-2006-0045 193, filed May 19, 2006, entitled "Separately Trained System and Method Using Two-Layered Neural Network with Target Values of Hidden Nodes". The benefit under 35 USC 119(a) of the Korean (Republic of) application is hereby claimed, and the aforementioned application is hereby incorporated herein by reference.

BACKGROUND OF THE INVENTION

1. Field of the Invention

The present invention relates, in general, to a separate learning system and method using a two-layered neural network having target values for hidden nodes and, more particularly, to a separate learning system and method using a two-layered neural network having target values for hidden nodes, which set the target values for hidden nodes during separate learning, so that a computational process is separated into an upper connection and a lower connection without changing a network structure and a weight updating rule, thus reducing computational work.

2. Description of the Related Art

Generally, a neural network system has various uses and application fields. For example, a neural network system can be applied and utilized in various fields such as customer management and electronic commerce in data mining, network management, speech recognition, and financial services.

In detail, in data mining fields, Amazon.com and NCOF use a neural network system to manage of customers who purchase books, and to support searches for products on electronic commerce sites. In financial service fields, a neural network system is used to analyze the shape of charts, and to predict tendencies of the price index of stocks. Visa international and Mellon bank in the United States use a neural network system in a general system for detecting the risk of transactions and in a method of picking out persons who are a high credit risk. Further, in the modeling and scientific theory development fields, a neural network system is used to determine conditions such as optimal temperature, pressure, or chemical materials, in a process of manufacturing fluorescent lamps, and is also utilized to detect inverse functions occurring during a manufacturing process in MIT and a simulation process in productivity laboratories.

Learning in a neural network is a process of setting weights to obtain a desired value at an output node that outputs results corresponding to some input. A representative learning method used in a neural network is a backpropagation learning method.

That is, a backpropagation learning method, which is a learning method used in multi-layer and feedforward neural networks, denotes a supervised learning technique. In order to perform learning, input data and desired output data are required.

However, a backpropagation algorithm has convergence problems, such as local minima or plateaus. The plateaus result in the problem of very slow convergence, and the local minima result in a problem in which gradients in all directions equal zero, thus causing the learning process unexpectedly to stop.

Therefore, an arbitrary set of initial weights is problematic in that it cannot guarantee the convergence of network training. In order to solve the above problems, there are methods such as 1) dynamic change of learning rate and momentum, and 2) the selection of a better function for activation or error evaluation based on a new weight updating rule.

Meanwhile, Quick-propagation (QP) and resilient propagation (RPROP) can provide a fast convergence rate, but cannot guarantee convergence to a global minimum.

Further, a genetic algorithm, conjugate gradient and second-order methods, such as Newton's method, require a greater storage space than backpropagation (BP). Therefore, there is a problem in that imbalance exists between convergence stability, required to avoid learning traps in a wide range of parameters, and a convergence speed, or between overall performance and the requirement of a storage space.

In other words, a backpropagation learning method is problematic in that, since it concentrates only on solving the imbalance between convergence speed and convergence stability due to its function, which is to solve the problem in which convergence speed is low and a learning process stalls at a local minimum, thus convergence fails, the backpropagation learning method is not flexible for arbitrary initial weights, cannot guarantee convergence in a wide range of parameters, and cannot solve the problem of local minima and plateaus.

SUMMARY OF THE INVENTION

Accordingly, the present invention has been made keeping in mind the above problems occurring in the prior art, and an object of the present invention is to provide a separate learning system and method, which set the target values for hidden nodes during separate learning, without a network structure and a weight updating rule not changed.

Another object of the present invention is to provide a separate learning system and method, which separate a calculation process into an upper connection and a lower connection, thus reducing computational work.

A further object of the present invention is to provide a separate learning system and method, which require only a small storage space, realize high convergence speed, and guarantee convergence stability somewhat, thus solving a convergence problem.

Yet another object of the present invention is to provide a separate learning system and method, which can more rapidly and stably escape from local minima and plateaus.

In order to accomplish the above objects, the present invention provides a separate learning system using a two-layered neural network having target values for hidden nodes, comprising an input layer for receiving training data from a user, and including at least one input node; a hidden layer including at least one hidden node; a first connection weight unit for connecting the input layer to the hidden layer, and changing a weight between the input node and the hidden node, thus performing learning; an output layer for outputting training data; a second connection weight unit for connecting the hidden layer to the output layer, changing a weight between the output and the hidden node, and calculating a target value for the hidden node, based on a current error for the output node, thus performing learning; and a control unit for stopping learning, fixing the second connection weight unit, turning a learning direction to the first connection weight unit, and causing learning to be repeatedly performed between the input node and the hidden node if a learning speed decreases or a cost function increases due to local minima or plateaus when the first connection weight unit is fixed and learning is performed using only the second connection weight unit, thus allowing learning to be repeatedly performed until learning converges to the target value for the hidden node.

Preferably, the first connection weight unit may comprise a reception module for receiving the target value for the hidden node and an error value for the hidden node from the second connection weight unit; a weight change module for changing the weight between the input node and the hidden node; and a first comparison-determination module for comparing the target value with the current value for the hidden node, received through the reception module, thus determining whether learning has reached the target value for the hidden node.

Preferably, the weight change module may adjust the weight using a gradient descent method.

Preferably, the second connection weight unit may comprise a second "comparison-determination" module for determining whether traffic congestion, such as a delay in learning time or a convergence failure, have occurred, and turning a learning direction to the first connection weight unit, thus allowing direction to the first connection weight unit, thus allowing learning to be performed between the input node and the hidden node; an error generation module for generating an error value for the hidden node according to the output node; a hidden node target value calculation module for calculating the target value for the hidden node; a transmission module for transmitting the error value for the hidden node; a transmission module for transmitting the error value for the hidden node and the target value for the hidden node to the first connection weight unit; a selection module for selecting an output node having a largest error value with respect to the hidden node; and a determination module for determining a number of hidden nodes to allow learning to be performed in the first connection weight unit.

Preferably, the determination module may select a single hidden node when learning is performed.

Preferably, the control unit may turn the learning direction of the first connection weight unit, maintain the learning direction until learning has reached the target value for the hidden node, and thereafter return a learning direction to the second connection weight unit, thus repeatedly performing learning until learning reaches a global minimum.

Further, the present invention provides a separate learning method using a two-layered neural network having target values for hidden nodes, comprising the steps of (a) performing learning in a second connection weight unit using training data; (b) determining whether learning has converged when a learning speed decreases due to local minima and plateaus, and stopping the learning if it is determined that learning has converged, otherwise turn a learning direction to a first connection weight unit and allowing learning to be performed between all of the input node at least one hidden node; (c) determining whether learning has reached a target value for the hidden node set by the first connection weight unit; (d) turning a learning direction to the second connection weight unit and performing learning between the hidden node and at least one output node if it is determined that learning has not reached the target value for the hidden node as a result of the determination; and (e) causing learning, performed in the second connection weight unit, to reach a global minimum.

Preferably, the separate learning method may further comprise the step of (a-1) receiving training data through the input layer to train a neural network before step (a).

Preferably, step (b) may further comprise the steps of (b-1) selecting an output node having a largest error value with respect to the hidden node if it is determined that learning has not converged; (b-2) calculating the target value for the hidden node so that learning can reach a global minimum; and (b-3) transmitting the error value for the hidden node and the target value for the hidden node to the first connection weight unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Before description is made, it is to be noted that the terms or words used in the present specification and claims should be interpreted to have meaning and concepts suitable for the technical spirit of the present invention, based on the principle that an inventor can suitably define terms to optimally describe his or her invention. In the following description of the present invention, detailed descriptions may be omitted if it is determined that the detailed descriptions of related well-known functions and construction may make the gist of the present invention unclear.

Hereinafter, embodiments of the present invention will be described in detail with reference to the attached drawings.

With reference to FIGS. 1A and 1B to FIG. 3, a separate learning system using a two-layered neural network having target values for hidden nodes according to an embodiment of the present invention is described below.

Figure 1A:
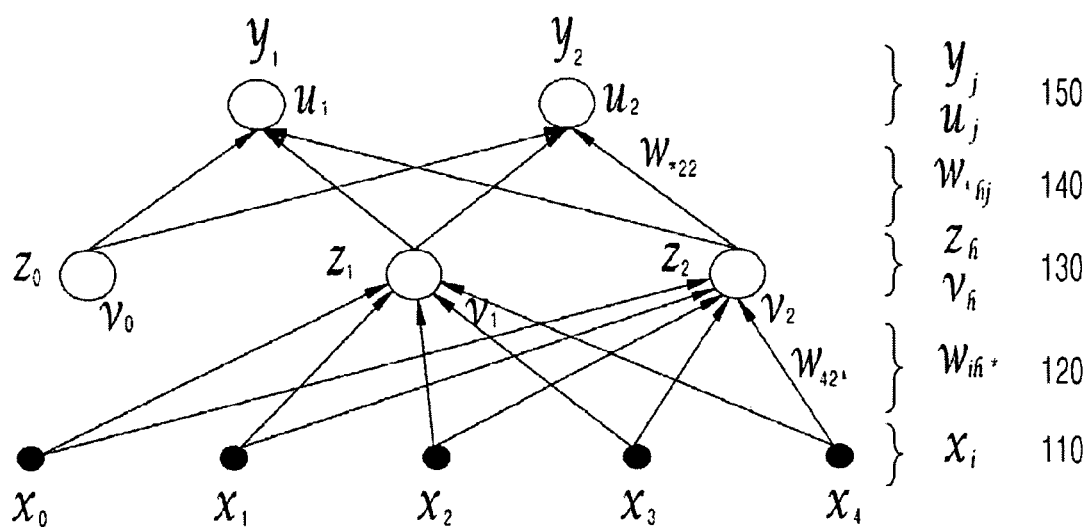
FIG. 1A is a conceptual view of a two-layered neural network according to an embodiment of the present invention.
Figure 1B:
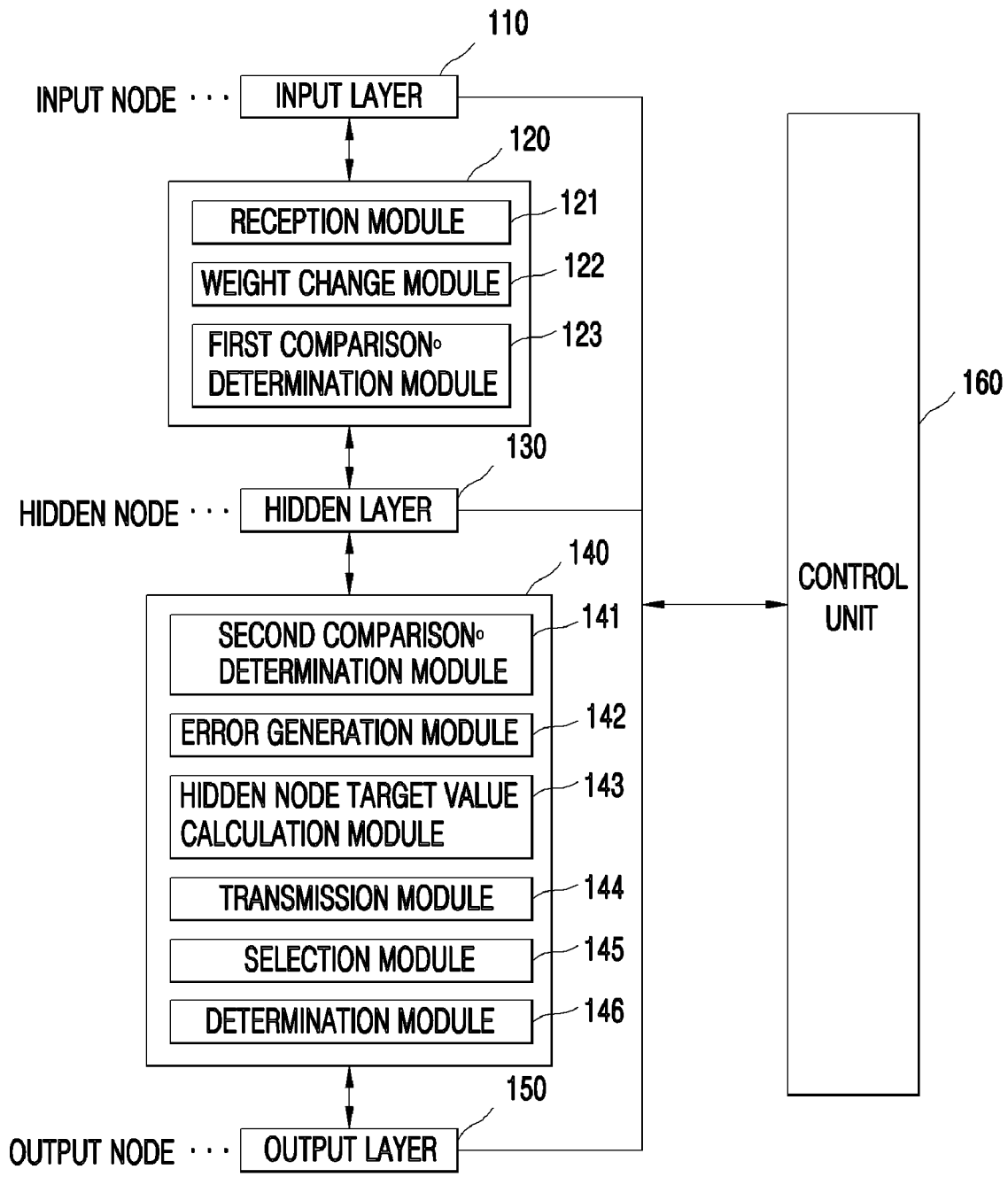
FIG. 1B is a diagram showing the construction of a separate learning system using a two-layered neural network having target values for hidden nodes according to an embodiment of the present invention.
Figure 2:
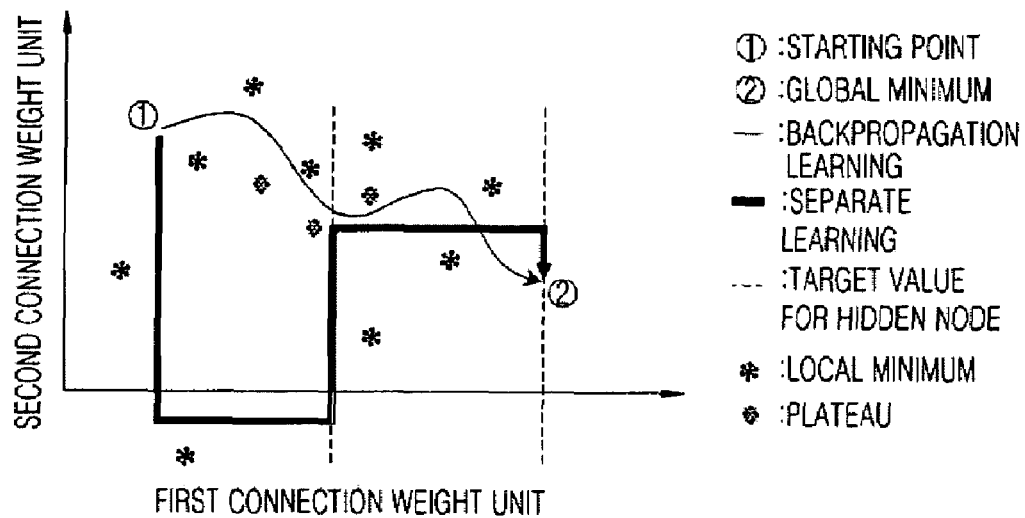
FIG. 2 is a diagram showing a method of predicting a gradient relative to a target value for a hidden node according to an embodiment of the present invention.
Figure 3:
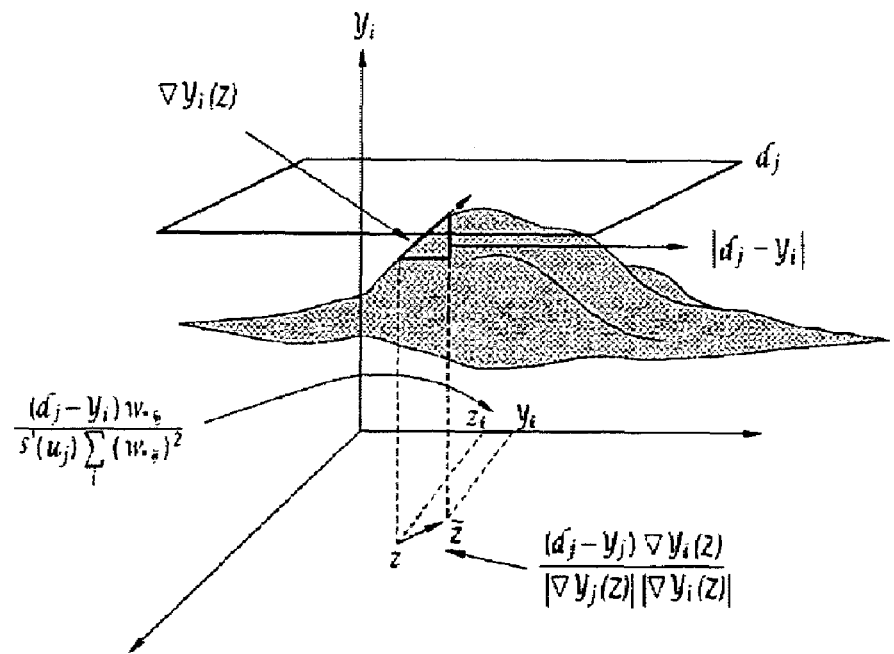
FIG. 3 is a diagram showing a method of detouring around obstacles, such as local minima and plateaus, according to an embodiment of the present invention.

FIG. 1A is a conceptual view of a two-layered neural network according to an embodiment of the present invention, FIG. 1B is a diagram showing the construction of a separate learning system using a two-layered neural network having target values for hidden nodes according to an embodiment of the present invention, FIG. 2 is a diagram showing a method of predicting a gradient relative to a target value for a hidden node according to an embodiment of the present invention, and FIG. 3 is a diagram showing a method of detouring around obstacles, such as local minima and plateaus, according to an embodiment of the present invention.

In a separate learning system using a two-layered neural network having target values for hidden nodes, a learning system 100 performs a learning function by learning weights through training data and making generalizations about the characteristics of training data, as shown in FIG. 1A, and includes an input layer 110, a first connection weight unit 120, a hidden layer 130, a second connection weight 140, an output layer 150, and a control unit 160.

First, the input layer 110 functions to receive a plurality of pieces of training data from a user, and includes input nodes $X_n$ ($x_1, x_2, \ldots, x_n$).

Further, as shown in FIG. 1B, the first connection weight unit 120 functions to connect the input layer 110 to the hidden layer 130 through input-to-hidden connections, and to change weights between the input nodes and hidden nodes, included in the hidden layer 130, thus performing learning. The first connection weight unit 120 includes a reception module 121, a weight change module 122, and a "comparison-determination" module 123.

First, the reception module 121 functions to receive a target value and an error value for a corresponding hidden node from the second connection weight unit 140.

Further, the weight change module 122 functions to change the weights between the input nodes and the hidden nodes.

In detail, the weight change module 122 can perform a learning by adjusting the weights using a gradient descent method. In other words, the weights of the first connection weight unit 120 are adjusted so as to minimize the sum of squares of errors between actual output values, obtained from all input nodes for a network in which input/output functions are constructed using linear units, and target output values. A cost function thereof is expressed by the following Equation [1], $$E[w] = \frac{1}{2}\sum_j [d_j - y_j]^2 \qquad [1]$$

$$y_j = S(u_i)$$

$$u_i = \sum_h w_{*hj} z_h$$

$$z_h = S(v_h)$$

$$v_h = \sum_h w_{ih} * x_i$$

where $d_j$ is a target value for a j-th output node, S is an activation function, $x_i$ is an i-th input, $w_{ih*}$ is a weight directed from an i-th input node to an h-th hidden node, $Z_h$ is the output value of the h-th hidden node, $w_{*hj}$ is a weight directed from the h-th hidden node to the j-th output node, and $y_j$ is the output value of the j-th output node.

In this case, the cost function has different function values because of the values for hidden nodes. When the cost function increases, learning between the hidden nodes and the output nodes is stopped, and learning between the input nodes and the hidden nodes is performed.

For reference, a gradient descent rule for the connection of the hidden layer to the output layer is expressed by the following Equation [2].

$$\Delta w_{*hj} = -\eta \frac{\partial E}{\partial w_{*hj}} = \eta(d_j - y_j)S'(u_j)z_h \qquad [2]$$

The first connection weight of the first connection weight unit 120 corresponding to the connection from the input layer to the hidden layer is partially differentiated by $w_{ih*}$ using Equation [2], which is expressed by the following Equation [3]

$$\Delta w_{ih}* = -\eta \frac{\partial E}{\partial w_{ih}*} = \eta \sum_j \{(d_j - y_j)S'(u_j)w_{*hj}\}S'(v_h)x_i \qquad [3]$$

Further, the first "comparison-determination" module 123 functions to compare the actual output value of the hidden node with the target value and error value for the hidden node, received through the reception module 121, thus determining whether learning reaches the target value for the hidden node.

In this case, if learning converges to the target value for the hidden node, learning stops, otherwise the learning direction turns to the second connection weight unit 140, thus enabling learning to be performed between the hidden nodes and the output nodes.

For reference, the first connection weight in this embodiment is indicated by $w_{ih*}$, and denotes the connection from the hidden layer to the input layer.

Further, the second connection weight unit 140 functions to connect the hidden layer 130 to the output layer 150 through hidden-to-output connections, process outputs on the output nodes through respective hidden nodes, and calculate the target value for the hidden node, based on the current error of the output nodes, thus allowing learning to be performed. The second connection weight unit 140 includes a second comparison determination module 141, an error calculation module 142, a hidden node target value calculation module 143, a transmission module 144, a selection module 145, and a determination module 146.

First, the second "comparison-determination" module 141 determines whether traffic congestion, such as a delay in learning time or convergence failure, has occurred in a learning process, and turns the learning direction to the first connection weight unit 120, thus performing learning between the input nodes and the hidden nodes until learning reaches the set target value for the hidden node.

Further, the error generation module 142 functions to generate an error value for the hidden node to a corresponding output node.

In this case, an expected error associated with the error of $z_i$ for an output node $y_i$ is expressed by the following Equation [4].

$$\gamma_h - z_h = |\tilde{z} - z| \cdot \cos\theta \quad [4]$$
$$= \frac{(d_j - y_j) w_{*hj} s'(u_j)}{|\nabla y_i(z)|^2}$$
$$= \frac{(d_j - y_j) w_{*hj} s'(u_j)}{\sum_i \left(\frac{\partial y_i}{\partial z_i}\right)}$$
$$= \frac{(d_j - y_j) w_{*hj} s'(u_j)}{\sum_i (w_{*ij} s'(u_j))^2}$$
$$= \frac{(d_j - y_j) w_{*hj}}{s'(u_j) \sum_i (w_{*ij})^2}$$

If the absolute value of the weight vector from the hidden node to the output node is relatively large, there is a great influence on an error for the hidden node compared to other cases. Therefore, if the absolute value of the weight vector is multiplied by the expected error for the hidden node, and Equation [4] is expressed again, the following Equation [5] is obtained.

$$\gamma_h - z_h = \frac{(d_j - y_j) w_{*hj}}{s'(u_j) |w_{*j}|} \quad [5]$$

In this embodiment, the expected error $\gamma_h - z_h$ is obtained by multiplying the function $$\tilde{z} - z = \frac{(d_j - y_j) \nabla y_i(z)}{|\nabla y_i(z)| |\nabla y_i(z)|},$$

associated with the error for the hidden node $Z_h$ to the output node $y_i$, by $$\cos\theta = \text{sign}(d_j - y_j) \frac{\frac{\partial y_i}{\partial z_h}}{|\nabla y_i(z)|} = \text{sign}(d_j - y_j) \frac{w_{*hj} s'(u_j)}{|\nabla y_i(z)|}$$

when the angle between $\tilde{z} - z$ and $z_h$ is assumed to be $\theta$.

In this case, when $d_j - y_j \leq 0$, $\text{sign}(d_j - y_j) = 1$ is obtained, $w_{*j} = (w_{*1j}, w_{*2j}, \ldots, w_{*nj})$ is obtained, and n is the number of hidden nodes.

The above embodiment is described to estimate the target value for the hidden node $z_h$ in consideration of all hidden nodes to the output nodes at the time of generation of the error for the hidden node $z_h$, but the present invention is not limited to the above embodiment.

Further, the hidden node target value calculation module 143 functions to calculate the target value for the hidden node so that learning can reach a global minimum.

In detail, referring to FIG. 2, the hidden node target value calculation module 143 functions to calculate the target value for the hidden node $\gamma_h$, based on the current error value for the output node. That is, the error for the hidden node is calculated using a gradient corresponding to the direction of the hidden node and a selected output error, so that the target value for the hidden node is calculated.

In this case, a target value for a corresponding hidden node denotes the value of a hidden node which causes a selected output to approximate its ideal value as closely as possible. A suitable approximate value corresponding to the target value for the hidden node is set.

That is, the cost function of the hidden node can be given by the following Equation [6] using the target value for the hidden node $\gamma_h$ calculated in Equation [4].

$$E(W) = \frac{1}{2}(\gamma_h - z_h)^2 \quad [6]$$

Further, the transmission module 144 functions to transmit the error value for the hidden node and the target value for the hidden node to the first connection weight unit 120.

Further, the selection module 145 functions to select the output node having the largest error with respect to a hidden node.

Further, the determination module 146 functions to determine which hidden node is to be selected so as to perform learning in the first connection weight unit 120.

This embodiment is set to select only a single hidden node at each time that learning is performed in the first connection weight unit 120.

That is, only one is selected from among a plurality of hidden nodes to perform learning, thus improving convergence speed.

Further, the output layer 150 functions to output training data that has been completely learned, and includes output nodes.

Further, referring to FIG. 3, if a learning speed decreases or a cost function increases due to local minima or plateaus when the first connection weight unit 120 is fixed and learning is performed by the second connection weight unit 140, the control unit 160 compulsorily stops learning, fixes the second connection weight unit 140, and turns the learning direction to the first connection weight unit 120, thus repeatedly performing learning between the input nodes and the hidden nodes. Accordingly, learning is repeatedly performed until the learning process converges to the set target value for the hidden node.

That is, after the learning method turns the learning direction of the first connection weight unit 120, and maintains the path until learning reaches the set target value for the hidden node, the learning method returns to the second connection weight unit 140, thus repeatedly performing learning until learning reaches a global minimum.

Therefore, the separate learning method travels a longer distance than does a backpropagation learning method, but can also travel at higher speed, and furthermore, convergence speed is also high.

Hereinafter, a separate learning method using a two-layered neural network having target values for hidden nodes is described using application software having the above configuration, with reference to FIGS. 4A and 4B.

Figure 4A:
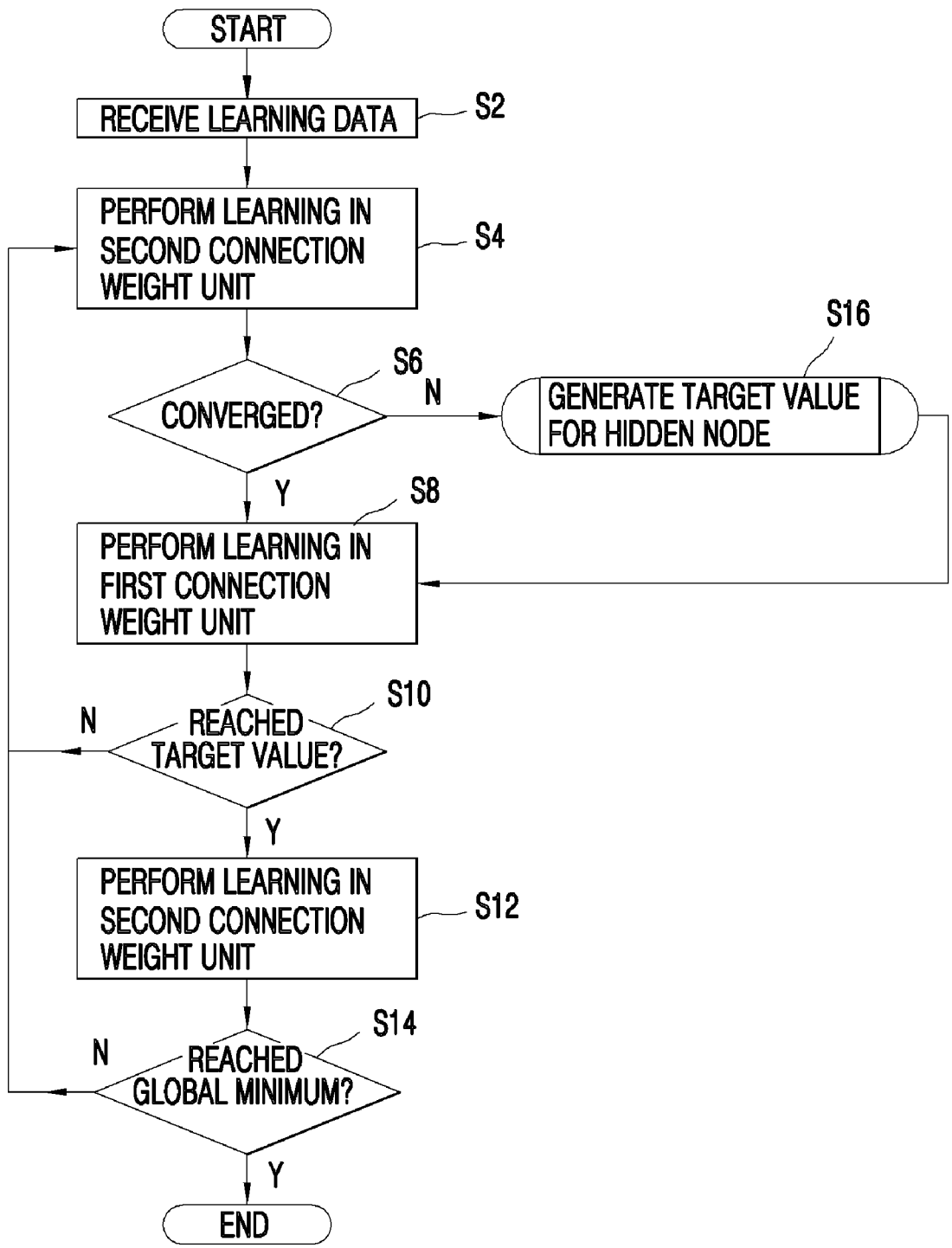
FIG. 4A is a flowchart of a separate learning method using a two-layered neural network having target values for hidden nodes according to an embodiment of the present invention.
Figure 4B:
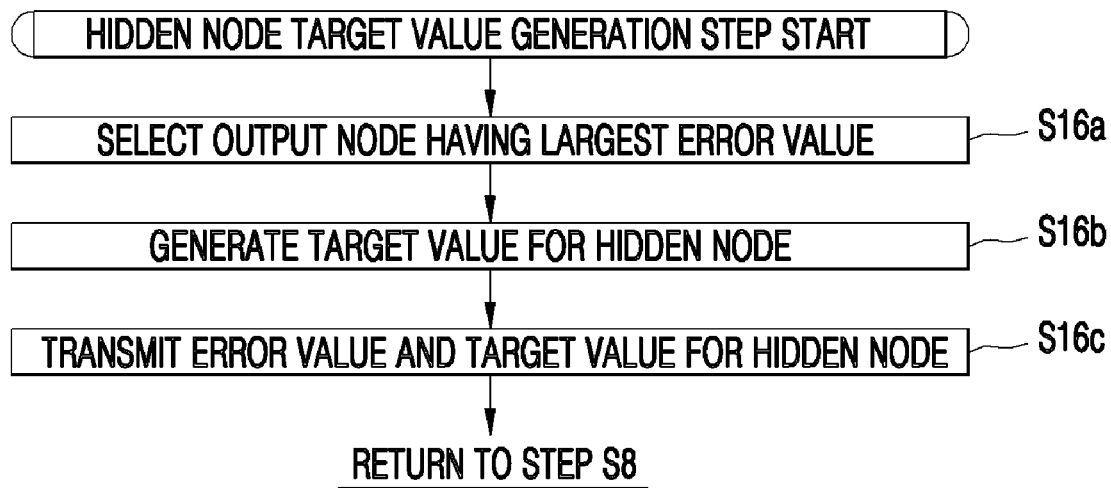
FIG. 4B is a detailed flowchart showing the step of generating a target value for a hidden node according to an embodiment of the present invention.

FIG. 4A is a flowchart of a separate learning method using a two-layered neural network having target values for hidden nodes according to an embodiment of the present invention, and FIG. 4B is a detailed flowchart showing the step of generating a target value for a hidden node according to an embodiment of the present invention.

As shown in FIG. 4A, the control unit 160 receives training data through the input layer 110 to train the neural network at step S2.

In this case, the control unit initializes the input layer, the hidden layer and the output layer, thus improving convergence speed using the target value for the hidden node.

Next, the control unit 160 performs learning in the second connection weight unit 140 using the received training data at step S4.

In this case, learning is performed using only the second connection weight unit after the first connection weight unit is fixed.

Next, the control unit determines whether learning has converged when learning speed decreases due to local minima and plateaus at step S6.

As a result of the determination at step S6, if learning is determined to have converged, the control unit 160 turns the learning direction to the first connection weight unit 120 at step S8, thus allowing learning to be performed between the input nodes and the hidden nodes.

In this case, the second connection weight unit is fixed and the learning direction turns to the first connection weight unit, so that learning is repeatedly performed.

When learning is performed in the first connection weight unit 120, the control unit 160 determines whether learning has reached the set target value for the hidden node at step S10. If it is determined that the learning has reached the target value for the hidden node, the control unit turns the learning direction to the second connection weight unit 140, and then continuously performs learning between the hidden nodes and the output nodes at step S12.

Next, the control unit 160 determines whether learning performed in the second connection weight unit 140 has reached a global minimum at step S14. If it is determined that learning has reached a global minimum, learning stops.

Meanwhile, if it is determined that learning has not reach a global minimum as a result of the determination at step S14, the control unit 160 returns to step S4.

Further, as a result of the determination at step S10, if it is determined that learning has reached the target value for the hidden node, the control unit 160 returns to step S4.

Meanwhile, if it is determined that the learning of the second connection weight unit 140 has not converged at step S6, the control unit 160 generates a target value for the hidden node, thus causing learning to converge at step S16.

In detail, with reference to FIG. 4B, step S16 is described. First, the control unit 160 selects the output node having the largest error value.

Next, the control unit 160 calculates the target value for the hidden node using Equation [5] so that learning can reach a global minimum at step S16b.

Finally, the control unit 160 transmits the generated error value for the hidden node and the generated target value for the hidden node to the first connection weight unit 120 at step S16c.

In this case, the control unit causes learning to reach the global minimum using the error value and the target value for the hidden node, received from the second connection weight unit.

EXPERIMENTAL EXAMPLES

In these experimental examples, in order to verify the performance of the separate learning method proposed in the present invention, experiments were conducted using a terminal having an AMD XP 2600+ 2.0 GB CPU and 512 MB Random Access Memory (RAM), using three types of data including 1) synthetic data, 2) Wisconsin breast Data, and 3) iris Data.

First, after distances d between respective input vectors and center vectors in all classes had been calculated to find the closest class and the next closest class, a desired class was determined using a given probability value. Then, experiments were conducted 270 times for each of the case where the number of hidden nodes increased, and the cases where learning rate and momentum increased from 0.1 to 0.9.

In this case, an input vector X, the number of input nodes n, and a probability variable a were input, each input pattern value was set to an arbitrary value between −1 and 1, the number of input patterns was set to 10 to 20, and the number of classes is set to 3 to 10. The probability variable α was assigned a value equal to or greater than 3.0 depending on the number of input nodes, so that data was generated to cause a region of overlapping classes to be relatively large. The measure of evaluating performance used the following equations, $$d_i = \|X - C_i\| = \left(\sum_{k=1}^{n} (x_k - \mu_k^i)^2\right)^{\frac{1}{2}}$$

$$t = \frac{d_j - d_i}{d_j + d_i}, d_j > d_i, 0 \le t \le 1$$

$$P_\alpha \langle (C_i|X) \rangle = \frac{1}{1 + e^{-\alpha t}}, P_\alpha \langle C_j|X \rangle = 1 - P_\alpha \langle C_i|X \rangle$$

where $C_i$ is the closest class, $\mu_k^i$ is the k-th dimensional value of the center $\mu^i$ of $C_i$, and $C_j$ is the next closest class.

Therefore, the experimental examples compare and evaluate the convergence rates, learning rates, learning times and mean square errors according to an increase in the number of hidden nodes, an increase in learning rate, and an increase in momentum, with respect to a separate learning method and a backpropagation learning method.

In the experimental examples, a limit time of about 50 seconds and a convergence error limit of 0.01 were set according to an experiment, so that only the cases where an error less than the limit is obtained within the limit time were included in the case of successful convergence rate. The mean square error was set to indicate the mean value of minimum errors.

First Experimental Example

Synthetic Data

A first experimental example was conducted to compare the performance of backpropagation learning and separate learning with each other when the learning rate was fixed at 0.3, and the number of hidden nodes was increased from 3 to 20.

Figure 5A:
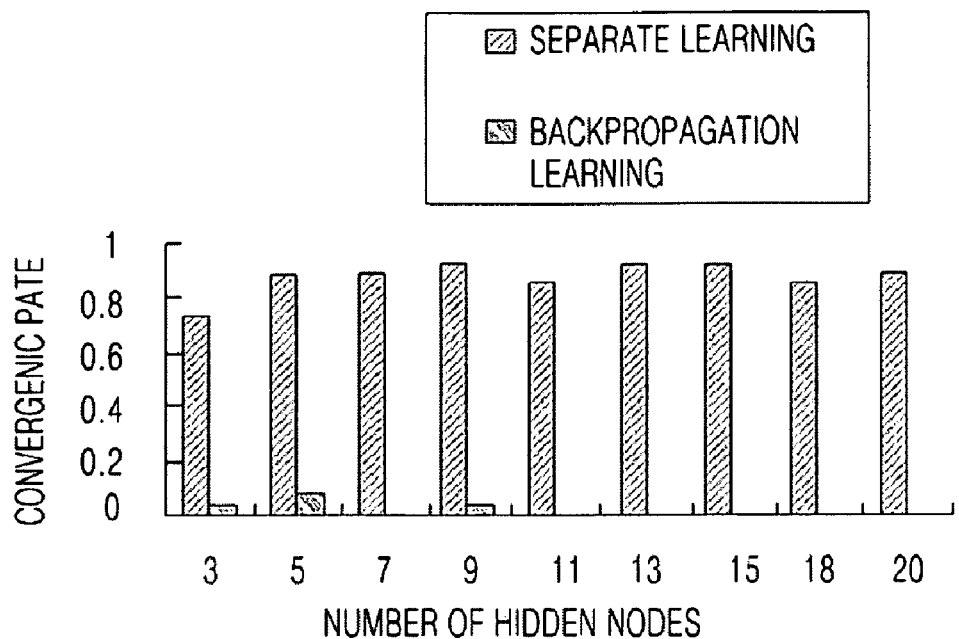
FIGS. 5A to 5C are graphs showing the comparison of the performance of separate learning and backpropagation learning with respect to an increase in the number of hidden nodes according to a first experimental example of the present invention.
Figure 5B:
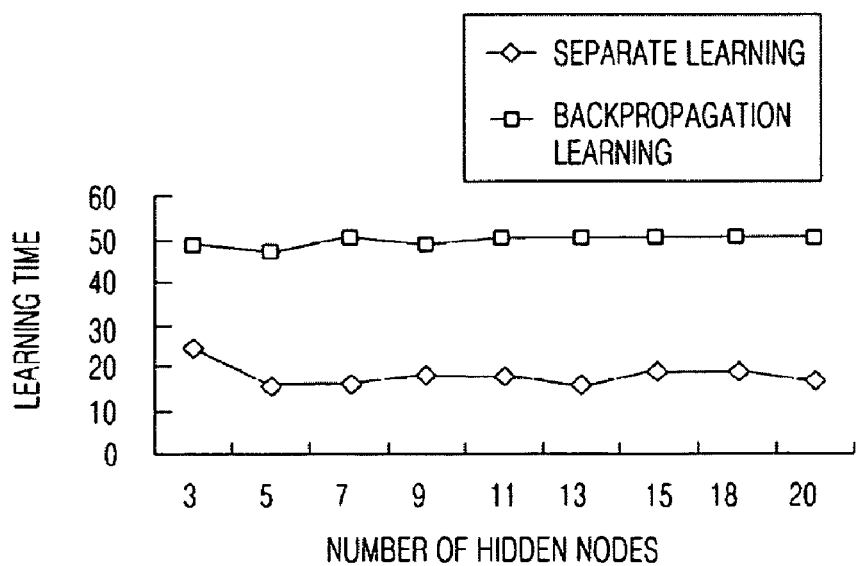
Figure 5C:
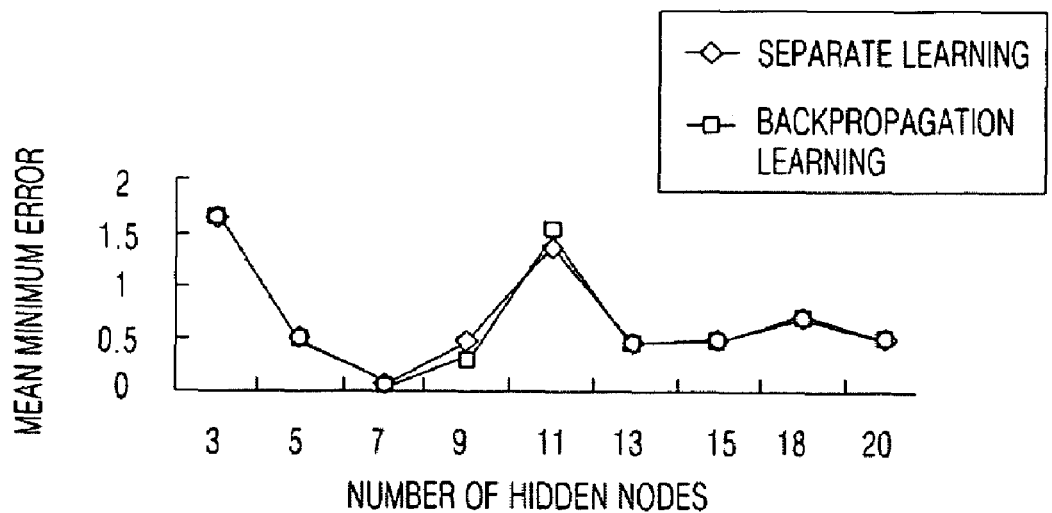

First, the experimental results of backpropagation learning and separate learning according to an increase in the number of hidden nodes are described. As shown in FIGS. 5A to 5C, when the number of hidden nodes was increased to 10 or above, backpropagation learning did not converge, but the mean square error did not decrease below 0.5. The reason for this is that an increase in the number of hidden nodes increases the complexity of a network, thus generating a large number of local minima.

Meanwhile, separate learning using synthetic data exhibited a high convergence rate regardless of an increase in the number of hidden nodes, so that separate learning was relatively free from the problem of local minima. In the case of learning time, it could be seen that backpropagation learning remained at the convergence limit time because it did not converge, whereas separate learning exhibited uniform and short learning time regardless of the number of hidden nodes.

Figure 6A:
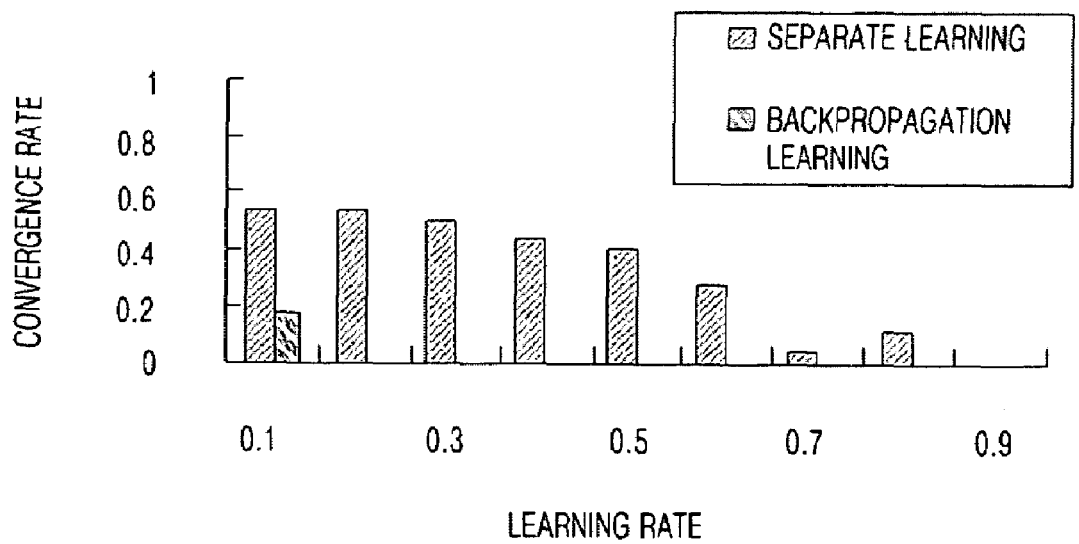
FIGS. 6A to 6C are graphs showing the comparison of the performance of separate learning and backpropagation learning with respect to an increase in learning rate according to the first experimental example of the present invention.
Figure 6B:
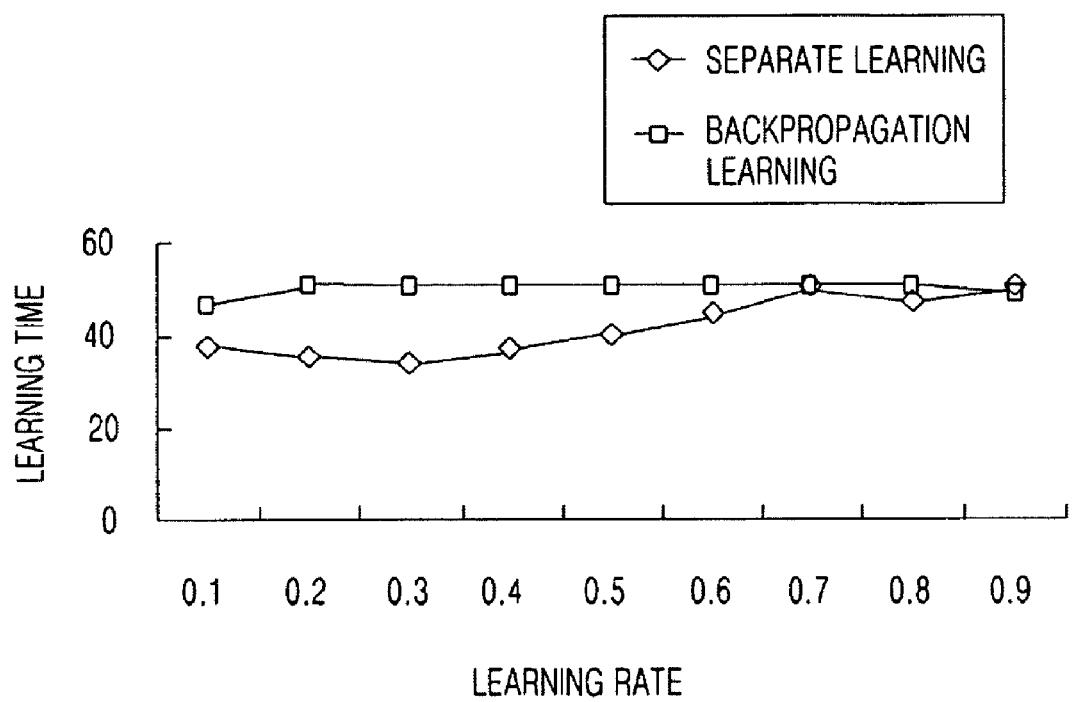
Figure 6C:
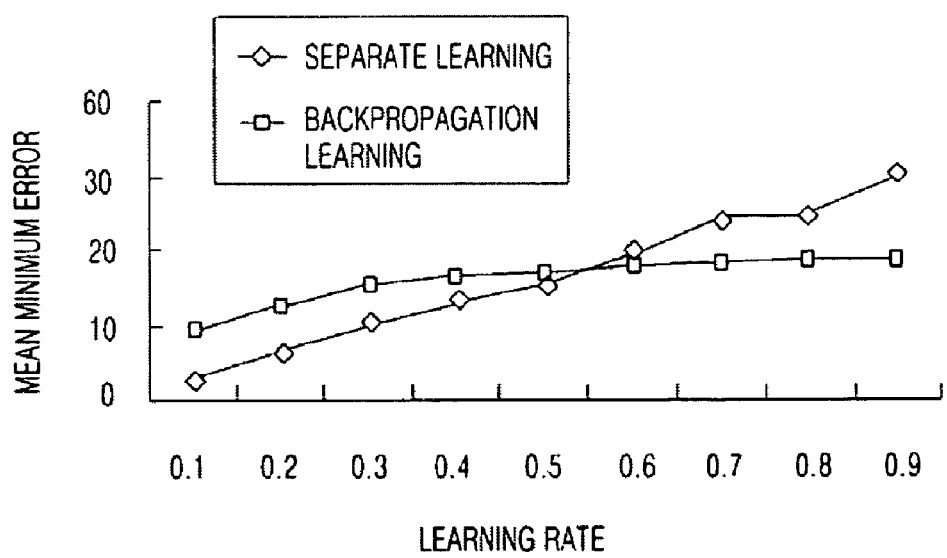

Further, the experimental results of backpropagation learning and separate learning, obtained when hidden nodes were arbitrarily selected and the learning rate was increased from 0.1 to 0.9, are described. As shown in FIGS. 6A to 6C, it could be seen that, in the case of convergence rate and learning time, separate learning was superior to backpropagation learning. In detail, backpropagation learning failed in convergence for all learning rates except for a convergence rate of 0.1, and the mean square error thereof did not decrease below 10. Further, for separate learning, as a learning rate increased, the number of convergences decreased.

Figure 7A:
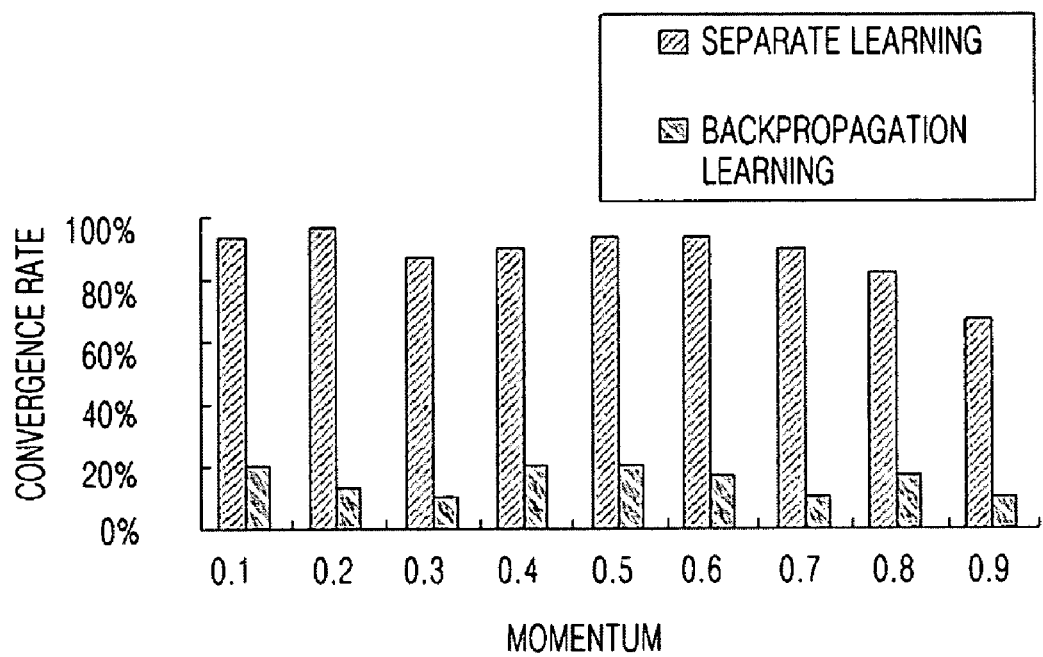
FIGS. 7A to 7C are graphs showing the comparison of the performance of separate learning and backpropagation learning with respect to an increase in momentum according to the first experimental example of the present invention.
Figure 7B:
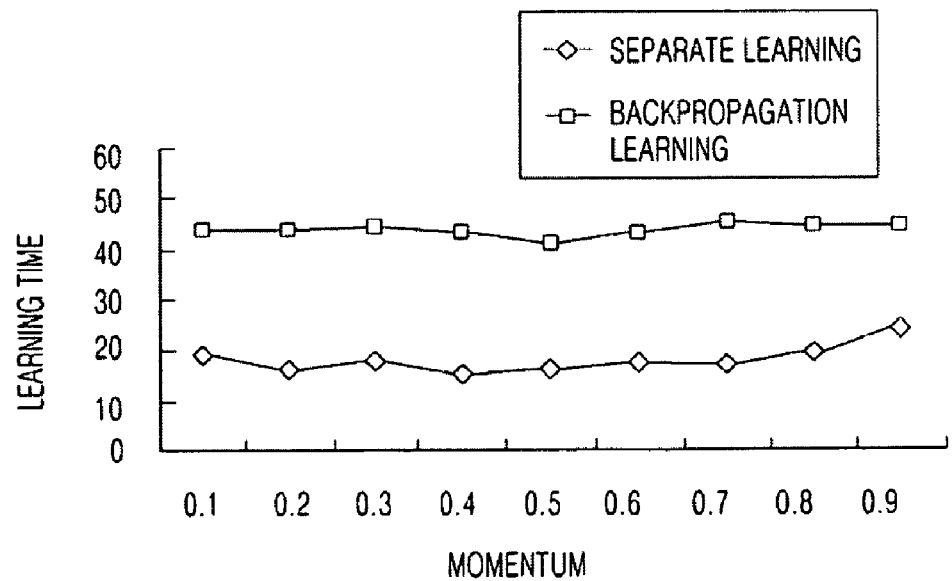
Figure 7C:
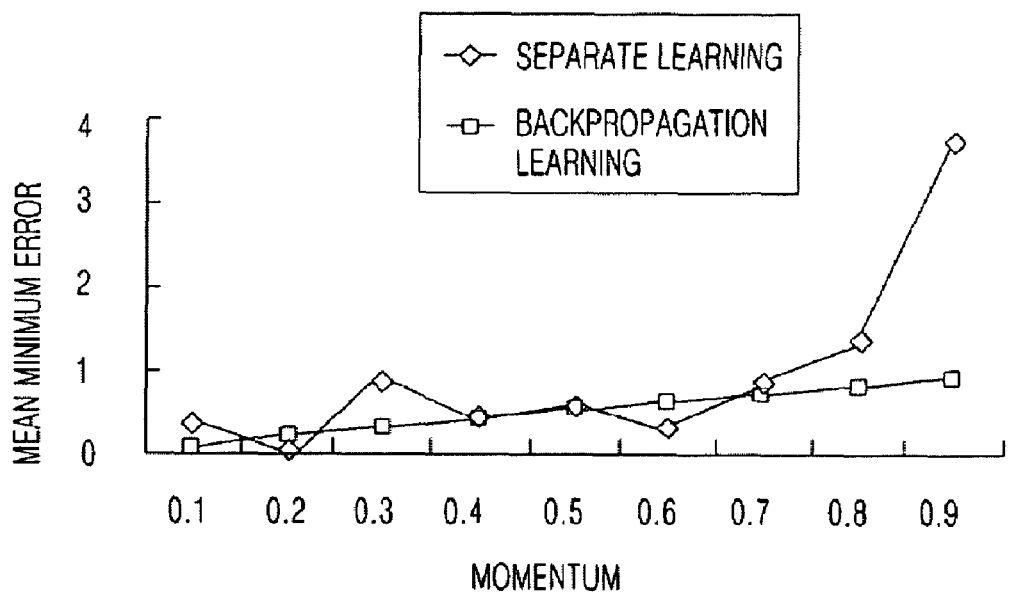

Further, experimental results, obtained through the comparison of the performance of backpropagation learning and separate learning when the learning rate was fixed at 0.3, and the value of momentum was increased from 0.1 to 0.9 while hidden nodes were arbitrarily selected, are described with reference to FIGS. 7A to 7C. In the case of the number of convergences, separate learning was generally superior to backpropagation learning. In the case of learning time, separate learning was performed at a speed about twice as fast as that of backpropagation learning.

That is, an increase in momentum is observed not to be a great help to separate learning or to backpropagation learning, so it is determined that momentum does not especially help eliminate obstacles such as local minima or plateaus.

In other words, a first experimental example was conducted in such a way that numbers of all iterations for 30 data samples, arbitrarily selected for both separate learning and backpropagation learning, are summed, and the total number of iterations is divided by the total learning time, in order to determine the learning time per iteration (epoch). In the case of separate learning, the total iteration number was 58641 and the total learning time was 1476 seconds, whereas, in the case of backpropagation learning, the total iteration number was 18205, and the total learning time was 1510 seconds.

Therefore, with respect to the learning time per iteration for each learning method, the learning time per iteration for separate learning was 0.025 seconds, and the learning time per iteration for backpropagation learning was 0.083 seconds. Accordingly, it could be seen that the learning time for separate learning was three times as short as that for backpropagation learning.

Second Experimental Example

Wisconsin Breast Data

A second experimental example is an experiment for determining whether the a breast tumor is a benign tumor or a malignant tumor using Wisconsin breast cancer data and 9 variables. The number of data samples was 457, and tumors were classified into two classes of benignancy and malignancy. Accordingly, an increase in the number of hidden nodes may decrease overall performance.

That is, as the results of experiments, conducted while changing the number of hidden nodes to two and three, better performance was obtained when the number of hidden nodes was fixed at two. Accordingly, the experiment was conducted after the number of hidden nodes was fixed at two.

Figure 8A:
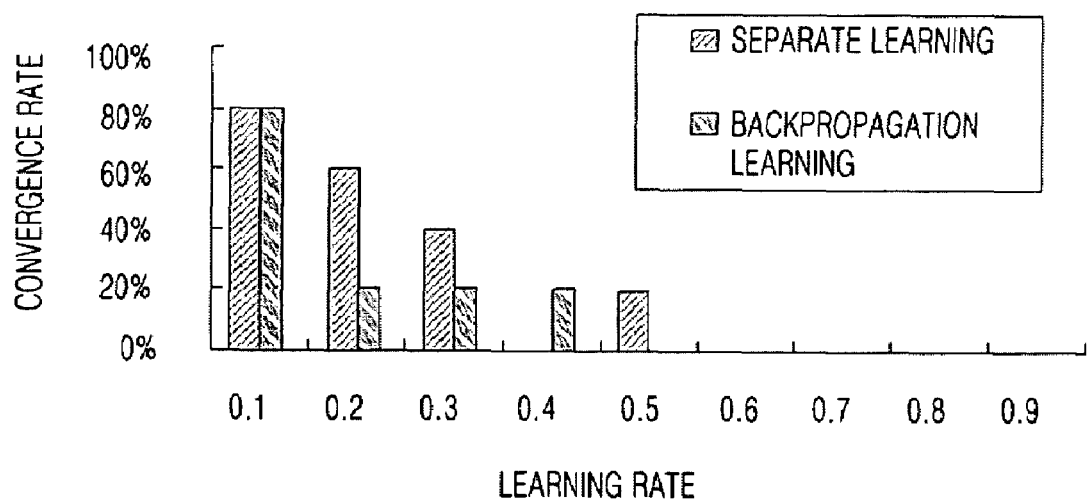
FIGS. 8A to 8C are graphs showing the comparison of the performance of separate learning and backpropagation learning with respect to an increase in learning rate according to a second experimental example of the present invention.
Figure 8B:
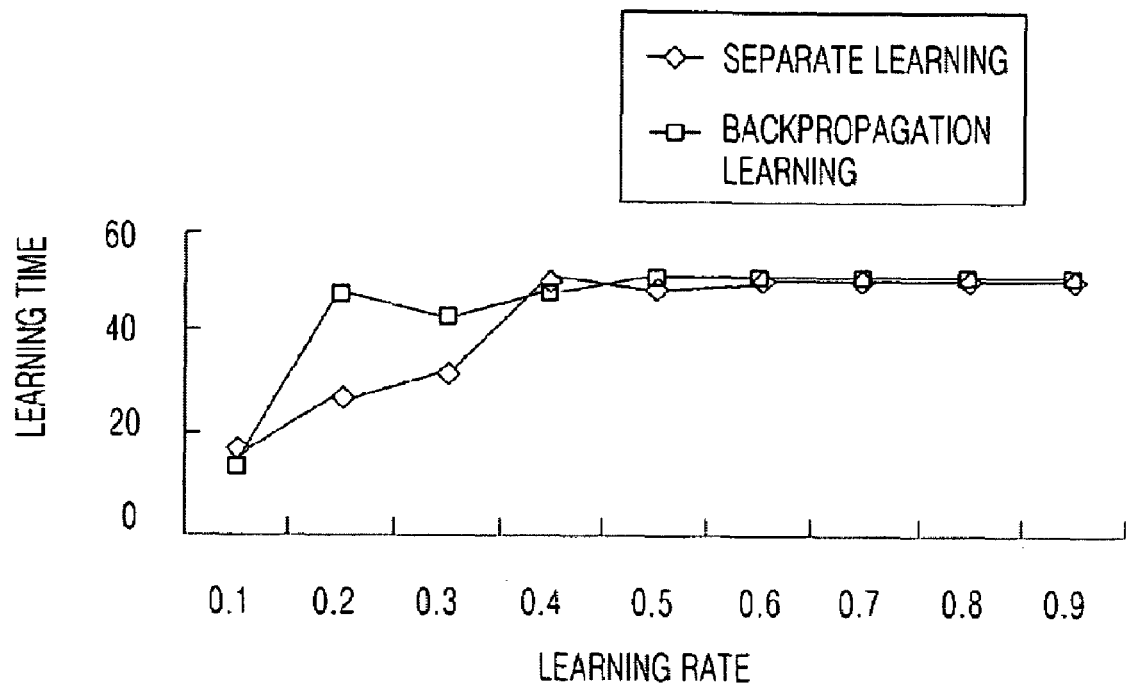
Figure 8C:
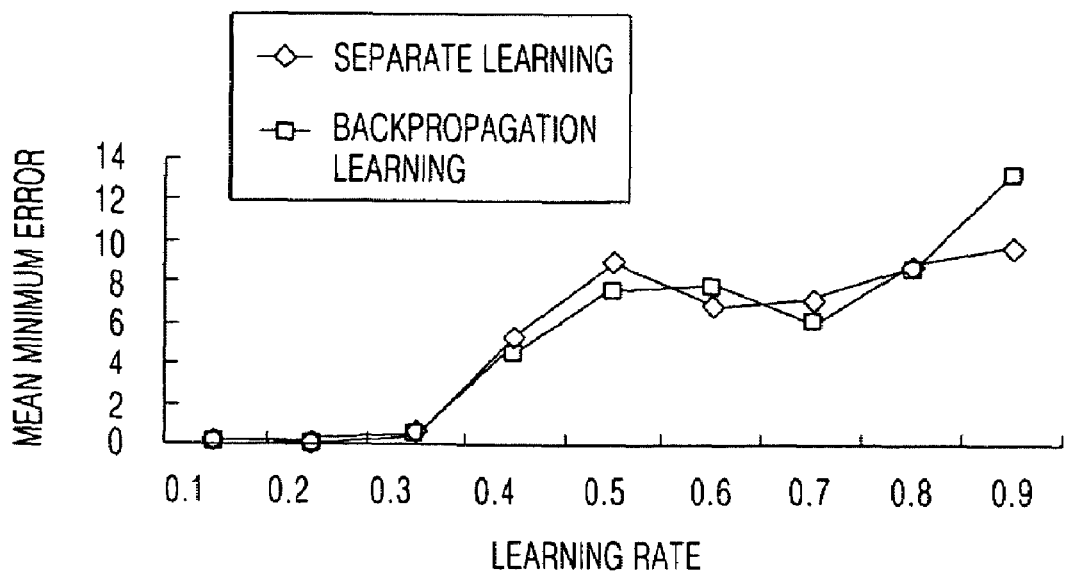

The experimental results are described below. As shown in FIGS. 8A to 8C, when momentum was fixed at 0.1 and a learning rate was increased from 0.1 to 0.9, separate learning was superior in both convergence rate and learning time to backpropagation learning at a low learning rate. That is, as the learning rate increased, the convergence rate decreased. In the case of a mean square error, separate learning and backpropagation learning exhibited almost the same results.

Figure 9A:
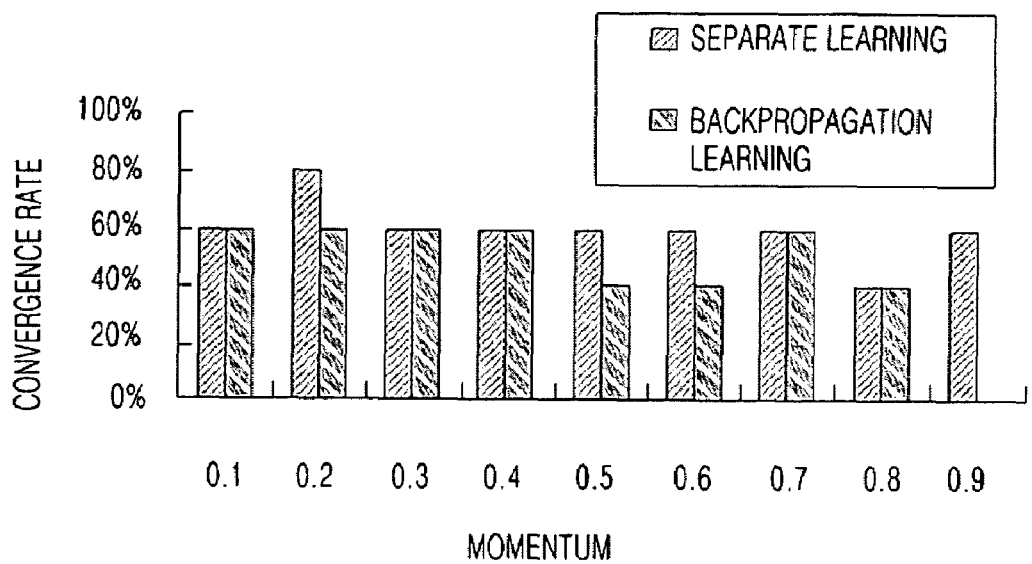
FIGS. 9A to 9C are graphs showing the comparison of the performance of separate learning and backpropagation learning with respect to an increase in momentum according to the second experimental example of the present invention.
Figure 9B:
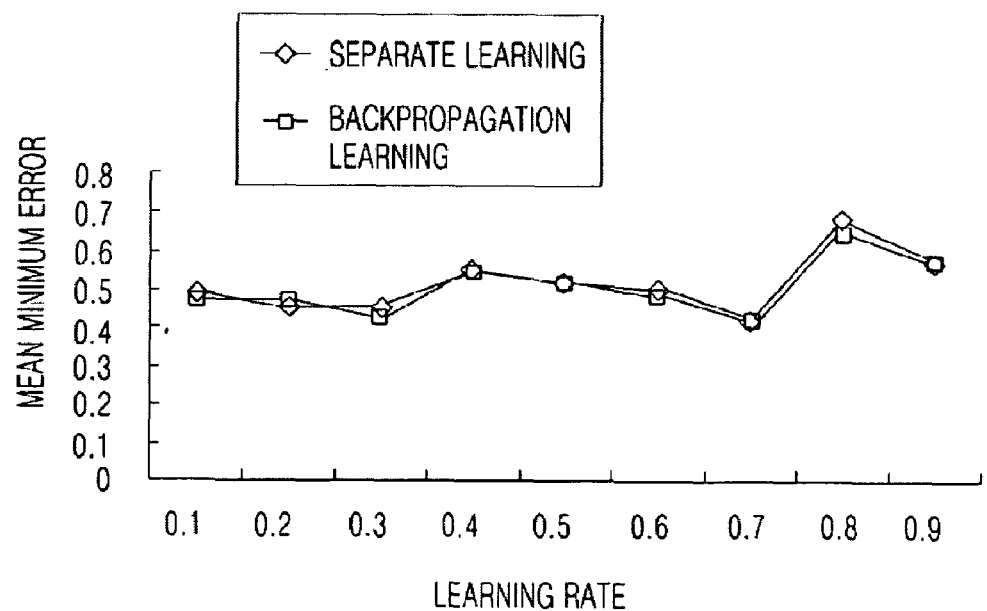
Figure 9C:
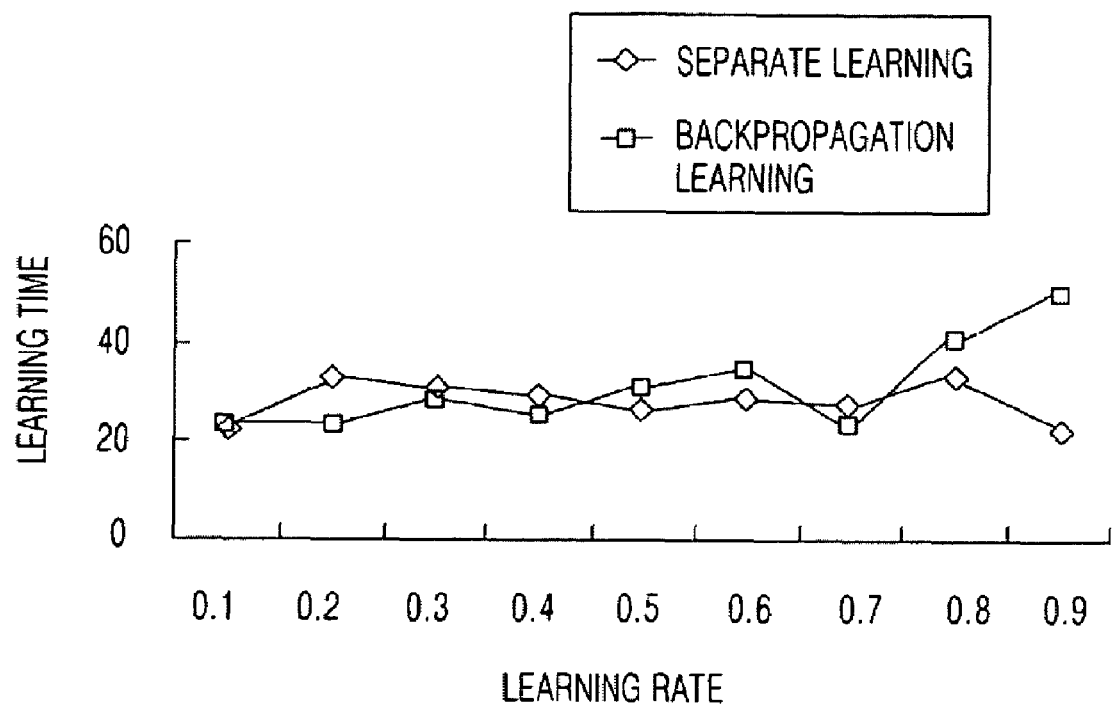

Further, the performances of backpropagation learning and separate learning, obtained when the learning rate was fixed at 0.1 and momentum was increased from 0.1 to 0.9, are described with reference to FIGS. 9A to 9C. In the case of convergence rate, separate learning and backpropagation learning exhibited almost the same convergence rate, but separate learning exhibited better performance. In the case of learning time, as momentum had a smaller value, backpropagation learning was performed fast, but, as momentum increased, separate learning was performed much faster.

Third Experimental Example

Iris Data

In a third experimental example, iris data is composed of four variables, that is, sepal length, sepal width, petal length, and petal width.

In this case, the total number of data samples was 150, and 50 data samples were provided for each class, the classes being set as setosa, versilcolor and vignica, which are three types of iris.

Figure 10A:
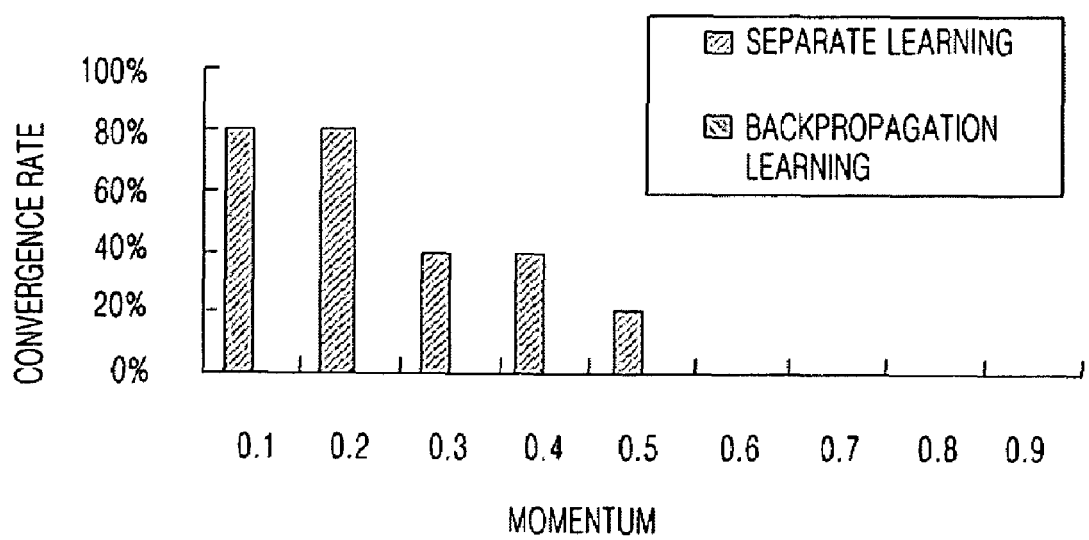
FIGS. 10A to 10C are graphs showing the comparison of the performance of separate learning and backpropagation learning with respect to an increase in learning rate according to a third experimental example of the present invention.
Figure 10B:
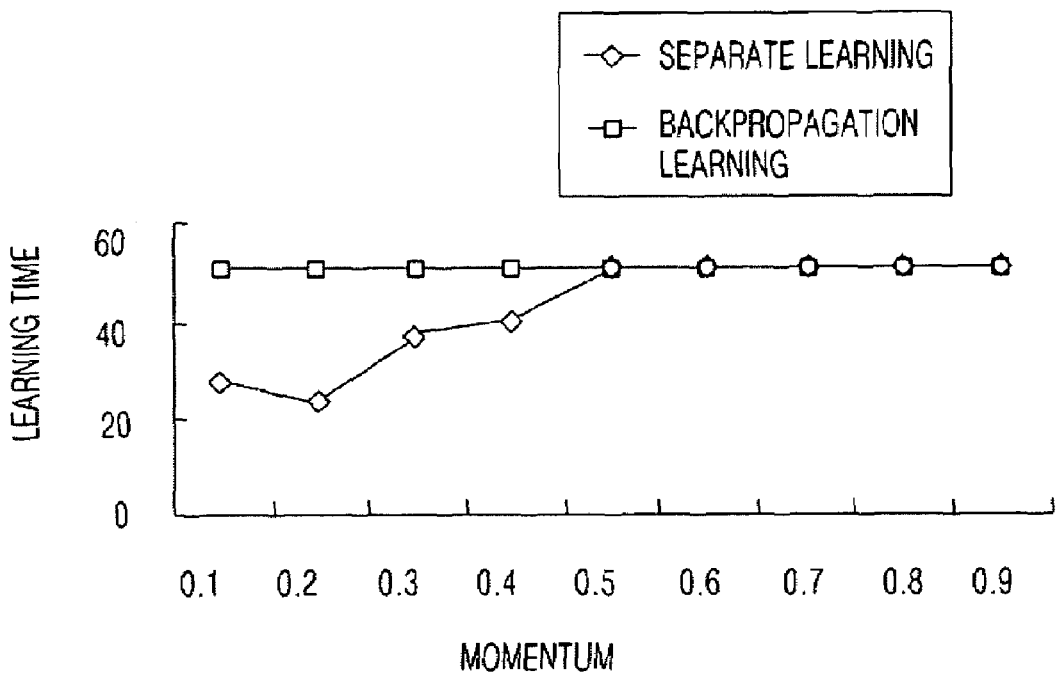
Figure 10C:
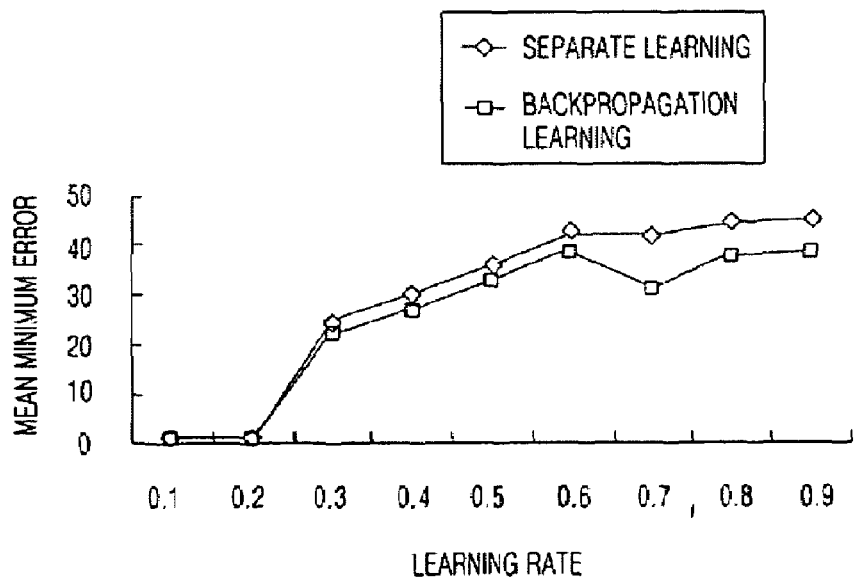

As a result of experiments, the performances of backpropagation learning and separate learning, obtained when momentum was fixed at 0.1 and the learning rate was increased from 0.1 to 0.9, are described with reference to FIGS. 10A to 10C. In the case of convergence rate, backpropagation learning did not converge, whereas separate learning exhibited high convergence rate. In the case of learning time, separate learning got better results than did backpropagation learning at a low learning rate. Further, it could be seen that, as the learning rates of separate learning and backpropagation learning increased, the number of convergences decreased. Therefore, in the case of mean square error, backpropagation learning exhibited a smaller error than did separate learning.

Figure 11A:
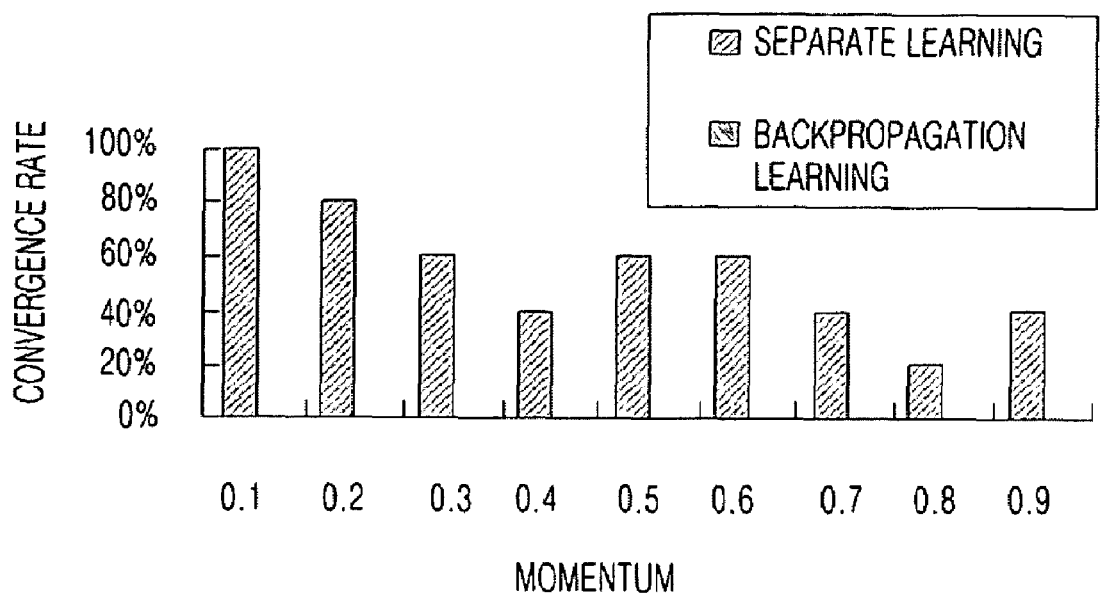
FIGS. 11A to 11C are graphs showing the comparison of the performance of separate learning and backpropagation
Figure 11B:
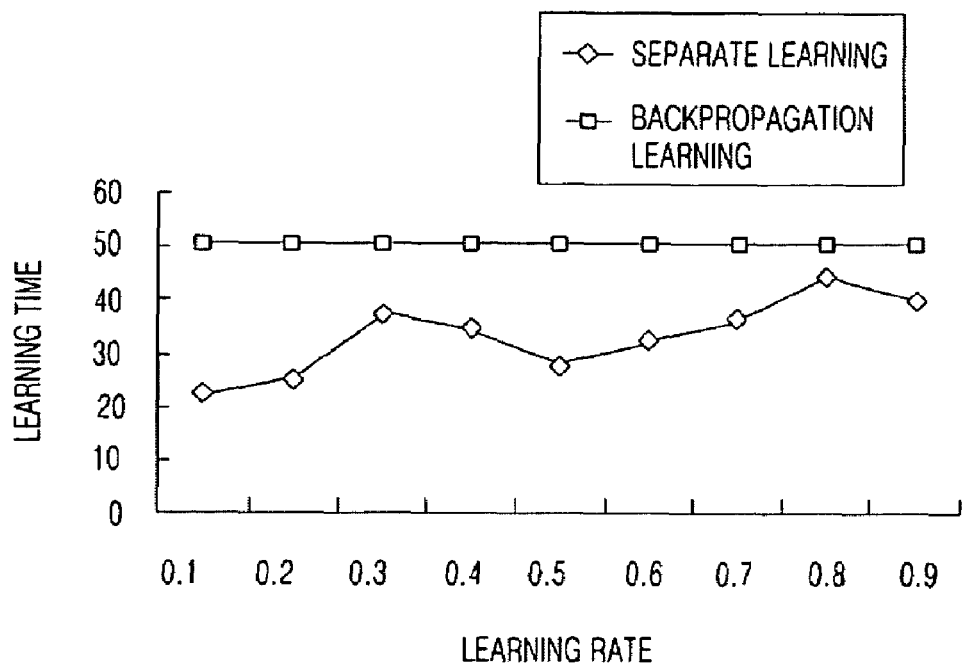
Figure 11C:
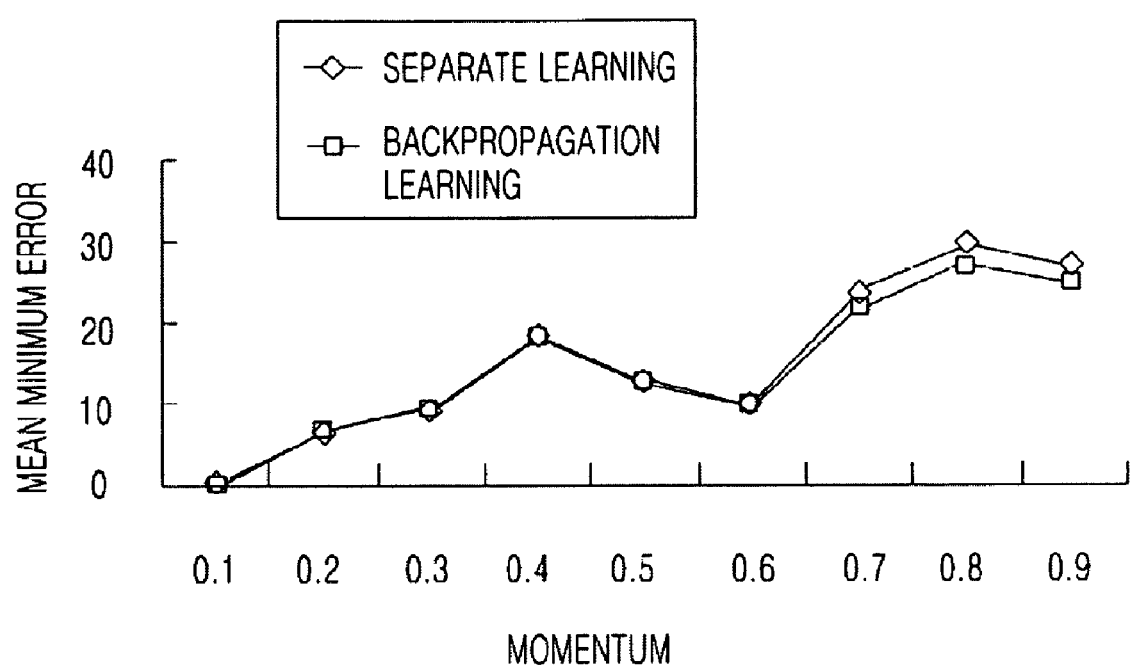

Further, the performance of backpropagation learning and separate learning, obtained when the learning rate was fixed at 0.1 and momentum was increased from 0.1 to 0.9, are described with reference to FIGS. 11A to 11C. In the case of convergence rate, separate learning exhibited better performance than did backpropagation learning regardless of an increase in momentum. In the case of learning time, separate learning exhibited better performance than did backpropagation learning. That is, it could be seen that backpropagation learning did not converge within a limited learning time with respect to overall learning, regardless of an increase in momentum.

As shown in the experimental results, the proposed separate learning exhibited better performance than did backpropagation learning with respect to convergence rate and learning time, regardless of an increase in the number of hidden nodes, an increase in learning rate, and an increase in momentum.

These results are obtained because the proposed method can solve the problem of convergence by providing different states to a weight updating rule, an unchanged network structure, target values and error values for hidden nodes, and a learning process. That is, computational advantages could be obtained through the fact that computational time per iteration of separate learning was less than that of backpropagation learning, and improved performance could be obtained through the application of various weight updating rules.

As described above, the present invention provides a separate learning system and method, which set target values for hidden nodes in separate learning, so that a network structure and a weight updating rule are not changed.

Further, the present invention is advantageous in that it divides a calculation process into upper and lower layers to perform learning, thus reducing computational work and consequently improving reliability.

Further, the present invention is advantageous in that it requires storage space having only a small capacity, realizes fast convergence, and guarantees stability somewhat, thus increasing the probability of convergence.

Further, the present invention is advantageous in that it sets target values for hidden nodes, thus realizing faster and more stable escape from local minima and plateaus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, it should be understood that the modifications, addition and substitutions, and equivalences thereto, belong to the scope of the present invention.

What is claimed is:

1. A separate learning system using a two-layered neural network having target values for hidden nodes, comprising:
a computer having a control unit;
an input layer for receiving training data from a user, and including at least one input node;
a hidden layer including at least one hidden node;
a first connection weight unit for connecting the input layer to the hidden layer, and changing a weight between the input node and the hidden node, thus performing learning, which is expressed by:

$$\Delta w_{ih*} = -\eta \frac{\partial E}{\partial w_{ih*}} = \eta \sum_j \{(d_j - y_j)S'(u_j)w_{*hj}\}S'(v_h)x_i$$

wherein $u_j$ is the input value of the j-th output node, $v_h$ is the input value of the h-th hidden node, $d_j$ is a target value for a j-th output node, S" is an activation function, $x_i$ is an i-th input, $w_{ih*}$ is a weight directed from an i-th input node to an h-th hidden node, $w_{*hj}$ is a weight directed from the h-th hidden node to the j-th output node, and $y_j$ is the output value of the j-th output node;
an output layer for outputting training data that has been completely learned;
a second connection weight unit for connecting the hidden layer to the output layer, changing a weight between the output and the hidden node, and calculating a target value for the hidden node, based on a current error for the output node, thus performing learning; and
the control unit stopping learning, fixing the second connection weight unit, turning a learning direction to the first connection weight unit, and causing learning to be repeatedly performed between the input node and the hidden node if a learning speed decreases or a cost function increases due to local minima or plateaus when the first connection weight unit is fixed and learning is performed using only the second connection weight unit, thus allowing learning to be repeatedly performed until learning converges to the target value for the hidden node.

2. The separate learning system according to claim 1, wherein the first connection weight unit comprises:
a reception module for receiving the target value for the hidden node and an error value for the hidden node from the second connection weight unit;
a weight change module for changing the weight between the input node and the hidden node; and
a first "comparison-determination" module for comparing the target value with the current value for the hidden node, received through the reception module, thus determining whether learning has reached the target value for the hidden node.

3. The separate learning system according to claim 2, wherein the weight change module adjusts the weight using a gradient descent method.

4. The separate learning system according to claim 1, wherein the second connection weight unit comprises:
a second "comparison-determination" module for determining whether traffic congestion, such as a delay in learning time or a convergence failure, have occurred, and turning a learning direction to the first connection weight unit, thus allowing learning to be performed between the input node and the hidden node until learning has reached the target value for the hidden node;
an error generation module for generating an error value for the hidden node according to the output node;
a hidden node target value calculation module for calculating the target value for the hidden node so that learning can reach a global minimum;
a transmission module for transmitting the error value for the hidden node and the target value for the hidden node to the first connection weight unit;
a selection module for selecting an output node having a largest error value with respect to the hidden node; and
a determination module for determining a number of hidden nodes to allow learning to be performed in the first connection weight unit.

5. The separate learning system according to claim 4, wherein the determination module selects a single hidden node when learning is performed.

6. The separate learning system according to claim 1, wherein the control unit turns the learning direction of the first connection weight unit, maintains the learning direction until learning has reached the target value for the hidden node, and thereafter returns a learning direction to the second connection weight unit, thus repeatedly performing learning until learning reaches a global minimum.

* * * * *